United States Patent [19]
Kondo et al.

[11] Patent Number: 5,404,178
[45] Date of Patent: Apr. 4, 1995

[54] NOISE ELIMINATING CIRCUIT

[75] Inventors: Tetsujiro Kondo; Yasuhiro Fujimori; Kunio Kawaguchi, all of Kanagawa, Japan

[73] Assignee: Sony Corporation, Tokyo, Japan

[21] Appl. No.: 132,346

[22] Filed: Oct. 6, 1993

[30] Foreign Application Priority Data

Oct. 8, 1992 [JP] Japan ................. 4-270288

[51] Int. Cl.⁶ .............................................. H04N 5/21
[52] U.S. Cl. .................................. 348/618; 348/619; 348/620
[58] Field of Search ............... 348/607, 618, 619, 620, 348/621, 622, 623, 624, 625, 627, 700; H04N 5/21, 5/213

[56] References Cited

U.S. PATENT DOCUMENTS

| | | | |
|---|---|---|---|
| 4,090,221 | 5/1978 | Connor | 348/618 |
| 4,860,104 | 8/1989 | Katsuyama | 348/620 |
| 5,140,424 | 8/1992 | Yoshimura et al. | 348/620 |

FOREIGN PATENT DOCUMENTS

| | | | |
|---|---|---|---|
| 0422672 | 4/1991 | European Pat. Off. | H04N 5/21 |
| 2575886 | 7/1986 | France | H04N 5/21 |
| 0013069 | 1/1990 | Japan | H04N 5/21 |

*Primary Examiner*—James J. Groody
*Assistant Examiner*—Michael H. Lee
*Attorney, Agent, or Firm*—William S. Frommer; Alvin Sinderbrand

[57] ABSTRACT

A noise eliminating circuit comprising a noise eliminating filter for moving image part to be used when an input image is of the moving image part, a noise eliminating filter for stationary image part to be used when the input image is of the station image part, these filters being adaptively selected between according to a motion of the input image, a detecting circuit for detecting the motion of the input image, and a selecting circuit for selecting between outputs of these filters based on an output of the detecting circuit, wherein the noise eliminating circuit for stationary image part outputs an average input image of number of stationary frames n to be entered. The novel constitution effectively suppresses a noise introduced in a moving image or a stationary image, generating an output signal with a good picture quality. Further, if outputs of the filters are adaptively mixed according to the motion of the input signal, a picture quality at a transition point between the moving image and the stationary image is substantially improved.

10 Claims, 9 Drawing Sheets

FIG. 4

MOTION DETECTOR 30

FIG. 5

EXAMPLE OF LAPLACIAN FILTER

FIG. 7

NOISE ELIMINATING CIRCUIT 10

FIG. 8

NOISE ELIMINATING CIRCUIT 10

FIG. 9

NOISE ELIMINATING CIRCUIT 10

FIG. 10 (PRIOR ART)

NOISE ELIMINATING CIRCUIT 10

FIG. 11 (PRIOR ART)

● : NOISE

NOISE ELIMINATING CIRCUIT

BACKGROUND OF THE INVENTION

1. Field of the Invention

The present invention relates to a noise eliminating circuit suitably used for preprocessing immediately before encoding an input signal.

2. Description of the Prior Art

It is known that an apparatus for compressing and decompressing an input image signal often has noise eliminating means immediately in front of an encoder provided in a data compression system of the apparatus. Of noise eliminating circuits used for the noise eliminating means, a noise eliminating circuit based on three-dimensional processing is known.

Figure 10:
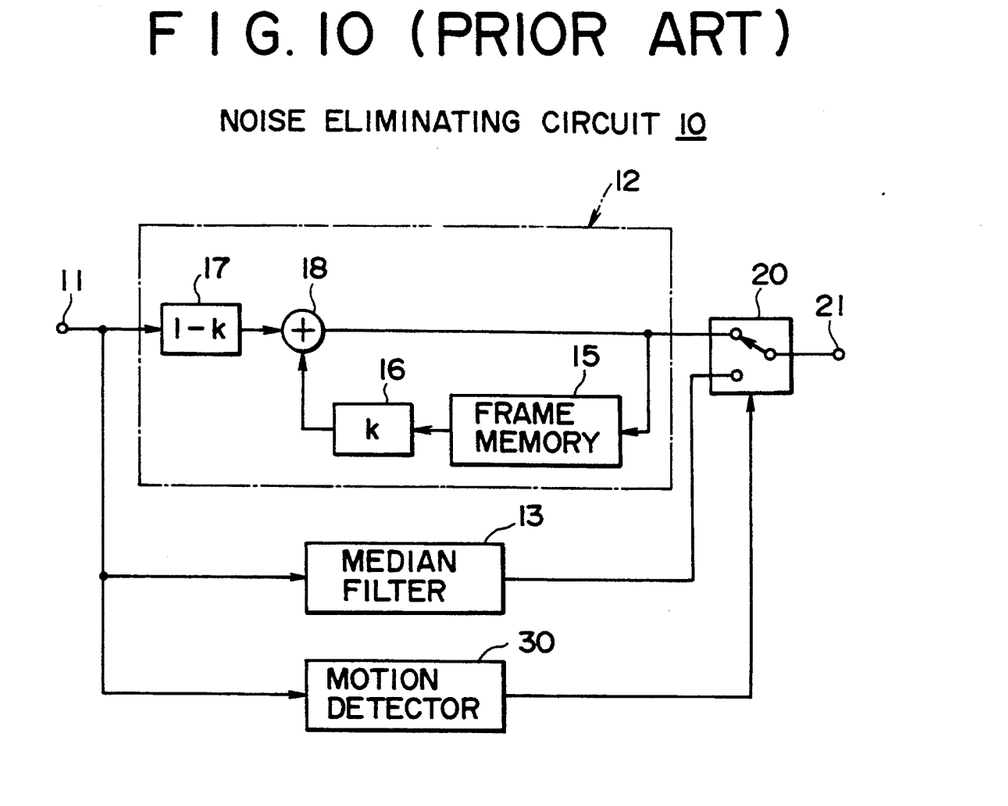
FIG. 10 is a diagram illustrating a conventional noise eliminating circuit.

FIG. 10 shows a block diagram of an example of the above-mentioned noise eliminating circuit. In the figure, a terminal 11 is supplied with a digitally converted input signal (image signal) for example. The input signal is supplied to a noise eliminating filter for stationary image part 12 if an input image based on pixels constituting the input signal is the stationary image part and a noise eliminating filter for moving image part 13 if the input image is the moving image part. The filters 12 and 13 perform noise elimination processing on the input signal according to contents of the input image. Output from each of the filters is sent to a switch 20.

The input image is also supplied to a motion detector 30 which detects a motion of the input image on a pixel basis. The switch 20 is adaptively operated by motion control output according to the detected motion of the input image. Thus, a pixel in the stationary image part is noise-eliminated by a time filter which performs filter processing relative to time and a dynamic, moving pixel is noise-eliminated through a spatial filter.

Thus, performing noise elimination by adaptively selecting between the filters according to a movement of an input image achieves noise elimination without degrading a picture quality of the input image.

The noise eliminating filter for stationary image 12 is a simple mean-value filter having a frame memory 15. In this filter, a memory output value from a preceding frame is multiplied by k (0<k<1) in a coefficient multiplier 16 and a resulting value is added in an adder 18 to a value obtained by multiplying an input image of a current frame supplied to the input terminal 11 by (1−k) in a coefficient multiplier 17. A resultant value provides a filter output.

Figure 11:
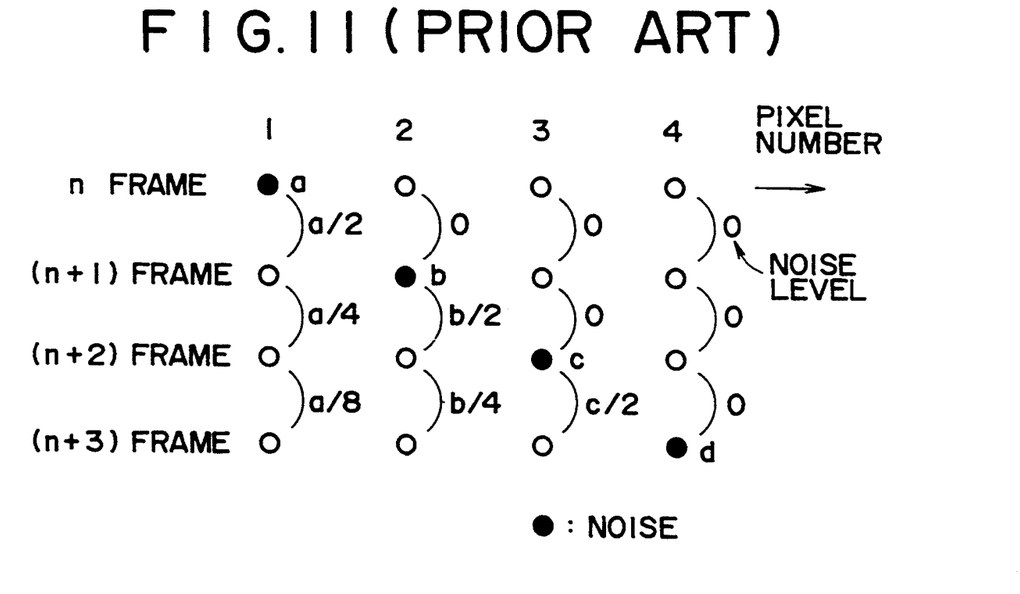
FIG. 11 is a diagram illustrating an operation of a filter for stationary image part.

FIG. 11 describes an operation of the noise eliminating filter 12. If a random noise indicated by a dot is introduced in a particular pixel of each frame and k=0.5, then noise levels a, b, c and d get smaller sequentially by the second power due to a filter effect in time of the noise eliminating filter 12.

Figure 12:
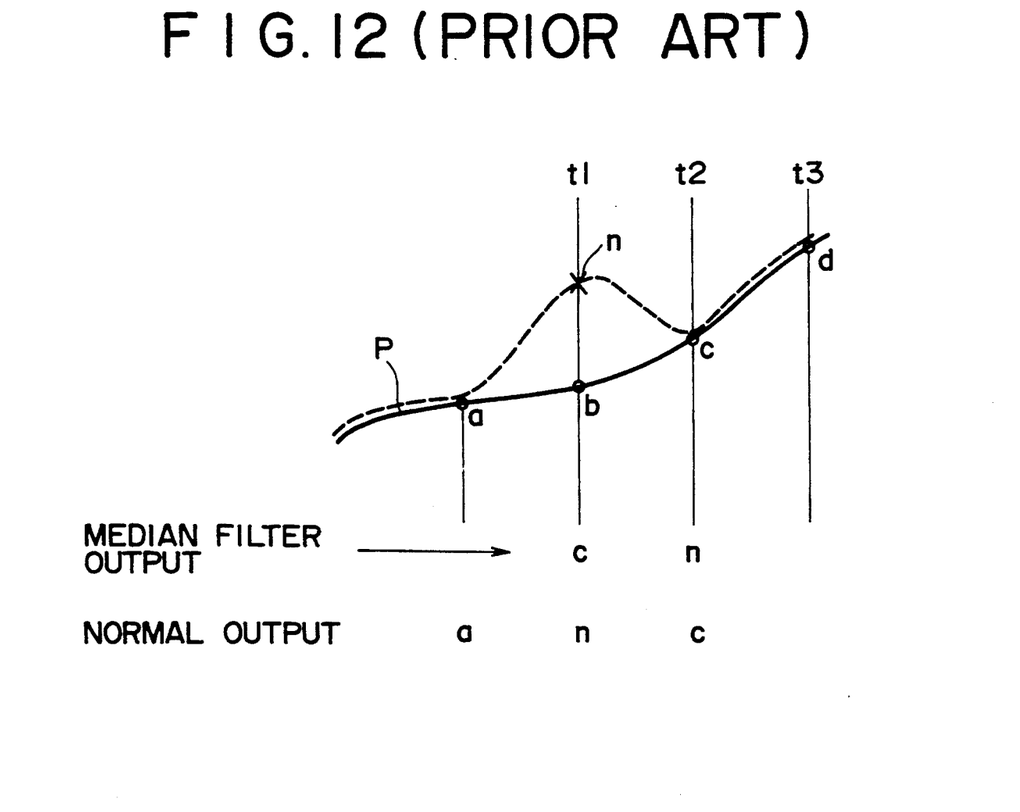
FIG. 12 is a diagram illustrating an operation of a filter for moving image part.

The noise eliminating filter for moving image part 13 is an intermediate-value filter such as a median filter, a type of a spatial filter. The intermediate-value filter uses a level of a pixel which is intermediate between levels of two pixels before and after a pixel in attention as a level of the pixel in attention. FIG. 12 describes an operation of this filter.

For an input image variation like a curve P, if noise n is introduced in pixel b in attention (an intrinsic level of the pixel is also b) for example, an intermediate value among a, n and c is selected; that is, c is selected. Since, in a next pixel, n is smaller than d, the noise n is selected for the first time. Since this noise level is lower than d, even if the noise n is selected, it does not extremely stand out from pixels around it and therefore is not prominent so much.

In this connection, a normal output without filtering results in a pixel level of FIG. 12 and the noise n is selected when the pixel level is low, making the noise level stand out and the selected noise n prominent.

Figure 13:
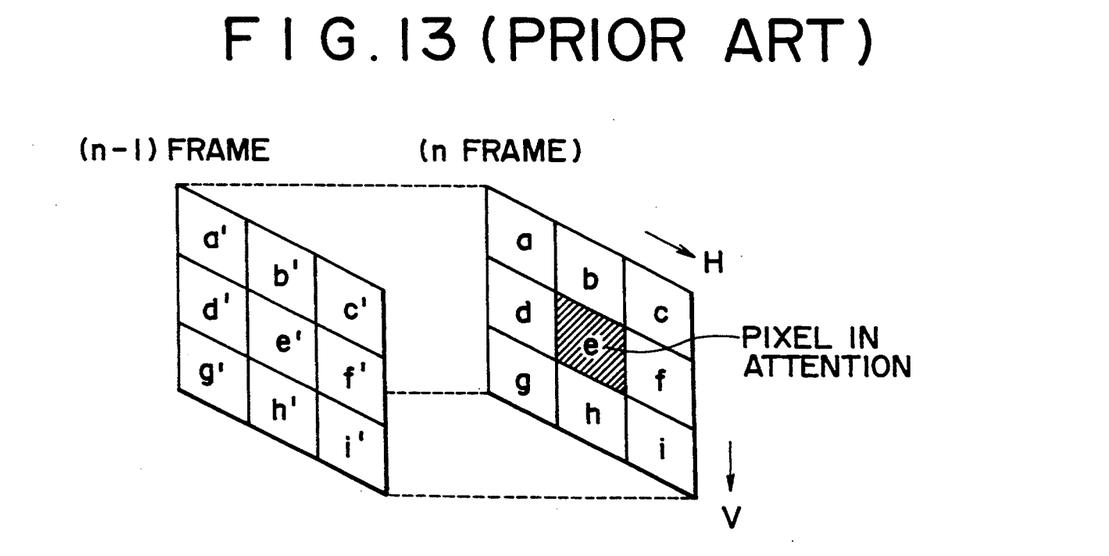
FIG. 13 is a diagram describing motion detection.

FIG. 13 describes detection of a motion of an input image. In the figure, a difference between each of 3×3 pixels around pixel e in attention in a current frame (nth frame) and each of the same pixel locations in a preceding frame (n−1 frame) is obtained (a−a', b−b', . . . i−i'). Then sum S of the differences is obtained.

A value of the sum S is compared with a predetermined threshold value. If the sum S is greater than the threshold value, a pixel in attention at the time is determined to be a moving pixel (moving image part); if the sum S is smaller than the threshold value, the pixel in attention is determined to be a stationary pixel (stationary image part).

However, since a conventional noise eliminating circuit having the above-mentioned constitution uses a time filter (mean-value filter), an averaged output remains to an end.

For example, if a noise (of noise level a) gets in a pixel 1 of the nth frame as shown in FIG. 11, the noise component will not disappear several frames later. Effects of the noise will remain for long, accompanying an after-image accordingly.

Besides, since an influence to be given by a noise to an immediately succeeding frame is as large as $\frac{1}{2}$, a picture quality in transition from a moving image part to a stationary image part is not improved effectively.

OBJECTS AND SUMMARY OF THE INVENTION

It is therefore an object of the present invention to provide a noise eliminating circuit for effectively improving picture quality, especially the picture quality at a transition point between images.

In carrying out the invention and according to one aspect thereof, there is provided a noise eliminating circuit wherein a noise eliminating filter for moving image part to be used when an input image is the moving image part and a noise eliminating filter for stationary image part to be used when the input image is the stationary image part are adaptively switched between according to a motion of the input image; based on an output from a detector for detecting the motion of the input image, one of outputs of the above-mentioned noise eliminating filters is selected; and the above-mentioned noise eliminating filter for stationary image part outputs an input image obtained by averaging the number of input stationary continuous frames n.

In carrying out the invention and according to another aspect thereof, there is provided a noise eliminating circuit wherein a noise eliminating filter for moving image part to be used when an input image is the moving image part and a noise eliminating filter for stationary image part to be used when the input image is the stationary image part are adaptively selected between according to a motion of the input image; based on an output of a detector for detecting the motion of the input image, outputs of the above-mentioned noise eliminating filters are adaptively mixed to be output; and the above-mentioned noise eliminating filter for stationary image part outputs average input image information determined by the number of continuous stationary frames n in an input stationary pixel.

Figure 1:
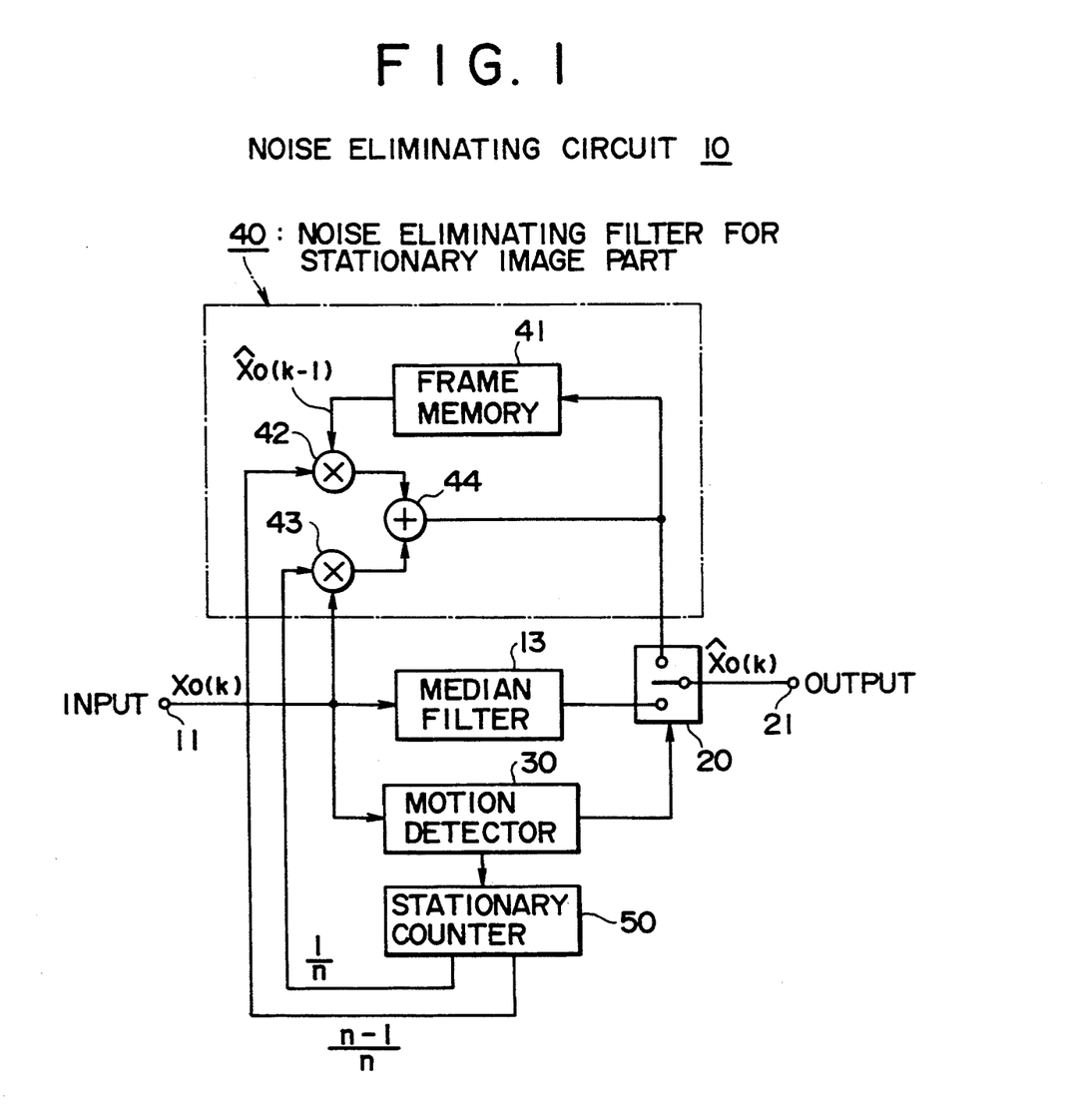
FIG. 1 is a block diagram illustrating a noise eliminating circuit practiced as a preferred embodiment of the invention.

In a preferred embodiment of the invention shown in FIG. 1, based on motion information given by a motion detector 30, a stationary counter 50 calculates the number of continuous stationary frames n in a stationary pixel (refer to FIG. 2) and, weighting factors 1/n and (n−1)/n from the number of continuous stationary frames n. These weighting factors are used when the input image is the stationary image part.

That is, a frame memory 41 and multiplier 42 provided in the noise eliminating filter for stationary image part 40 calculate a final output signal of a previous frame on which noise averaging processing in terms of time, the processing to be determined by the number of continuous stationary frames n at a stationary pixel has been performed. A multiplier 43 weights an input signal of a current frame by n. Output signals of the previous and current frames are added together to be used for an output of the noise eliminating filter 40.

Thus, since n=1 at the transition point from the moving image part to the stationary image part, only a signal of the current frame is output from an adder 44, resulting in a filter output having no after-image. Likewise, since n=1 also at a transition point from the stationary image part to the moving image part, only the signal of the current frame is output from the adder 44. Consequently, a picture quality at a moving part of an image is not degraded.

In other cases than mentioned above, the output signal of the previous frame is weighted by n to be output, so that an output signal with a noise suppressed is obtained.

BRIEF DESCRIPTION OF THE DRAWINGS

The above and other objects, features and advantages of the present invention will become more apparent from the following description taken in connection with the accompanying drawings, in which:

FIG. 9 is a diagram illustrating an embodiment of the invention wherein filter outputs are mixed rather than selected between;

DESCRIPTION OF THE PREFERRED EMBODIMENTS

A noise eliminating circuit practiced as a preferred embodiment of this invention and as applied to a data compression system of a CODEC (Coder/Decoder) apparatus will be described in detail with reference to drawings.

FIG. 1 shows the preferred embodiment of the noise eliminating circuit according to the invention. An input signal entered in a terminal 11 is supplied to the noise eliminating filter for moving image part 13 and the noise eliminating filter for stationary image part 40 at the same time. These filters 13 and 40 are switched between by a switch 20 and an output of a selected filter is sent to an output terminal 21.

Figure 2:
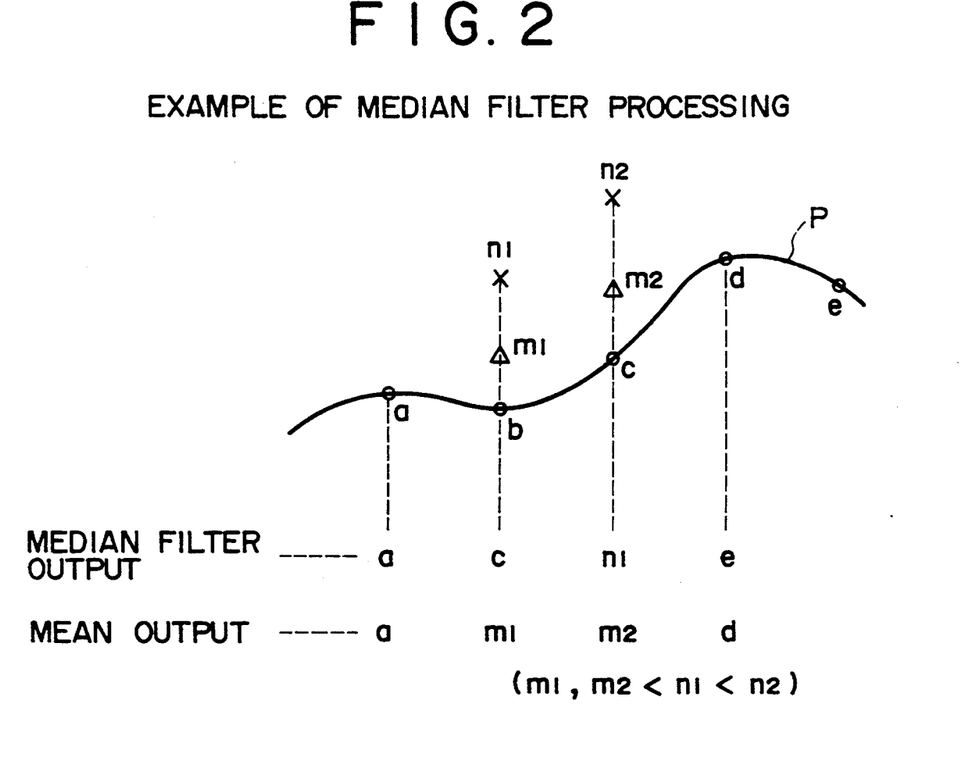
FIG. 2 shows an example of processing of a median filter used as a spatial filter.

For the noise eliminating filter 13, a conventional filter such as a median filter, one of spatial filters, may be used. FIG. 2 shows an example of processing of the median filter. In this example, noises n1 and n2 are introduced in the input signal (with a waveform p).

On the other hand, if the input signal is a stationary image, the noise eliminating filter for stationary image part 40, which comprises frame memory 41, multipliers 42 and 43 and adder 44, generates a mean value of the current input signal with noise and the previous signal stored in the frame memory 41. For example, as shown in FIG. 2, since no noise exists for data "a" in both the current frame and the previous frame, the mean data generated by the noise eliminating filter for stationary image part 40 is also "a". When noise n1 and n2 exist for data "b" and "c" respectively, mean data m1 and m2 are calculated from noise n1 and n2 existing in the current frame and data "b" and "c" obtained in the previous frame.

Reference numeral 30 indicates a detector for detecting a motion of the input image. An embodiment of this detector will be described later. An output of this detector is sent to the switch 20 and a stationary counter 50 by which the number of continuous stationary frames n for a stationary frame is calculated.

Figure 3:
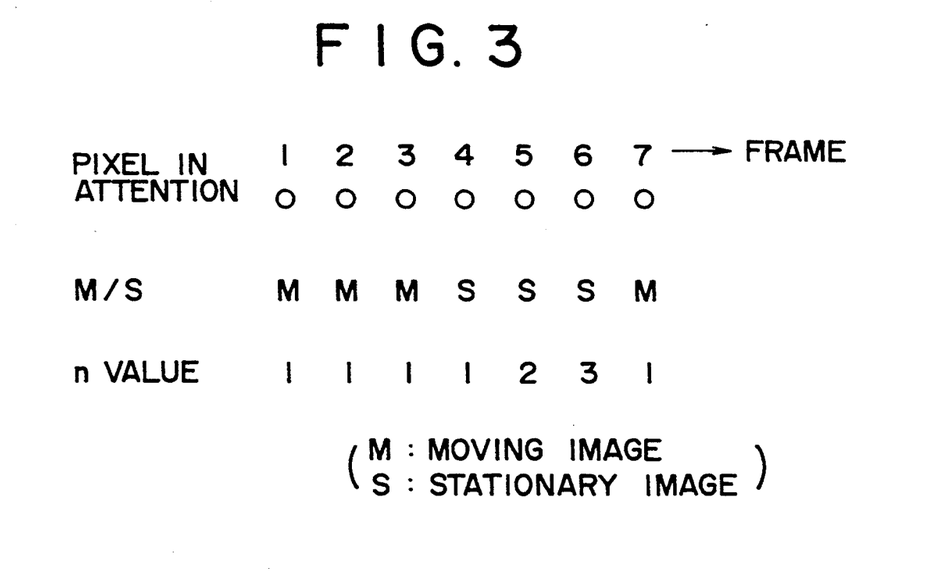
FIG. 3 is a diagram describing the number of continuous stationary frames at particular pixels.

FIG. 3 describes the number of continuous stationary frames n. As shown in the figure, given M being a moving pixel and S being a stationary pixel, n is always 1 if a pixel in attention is the moving pixel; n=1 also at a transition point from a moving image part to a stationary image part and vice versa. In the stationary image part, n is sequentially accumulated by the number of stationary frames. FIG. 3 indicates a n value obtained when the pixel in attention moves over three frames and following three frames are stationary.

The stationary counter 50 calculates weighting factors 1/n and (n−1)/n from this number of stationary frames n and sends the weighting factors to the filter for stationary image part 40.

Referring to FIG. 1, the filter for stationary image part 40 has a frame memory 41 for averaging. An output from the frame memory 41 (an output signal with the noise in the previous frame suppressed) is supplied to a first multiplier 42 to be multiplied by the weighting factor (n−1)/n. The input signal of the current frame supplied to the terminal 11 is multiplied by the weighting factor 1/n in a second multiplier 43. These two multiplication outputs are added together in an adder 44 to be used as a final output of the filter 40. The output of the adder 44 is also sent to the frame memory 41. Since the input to the frame memory 41 is:

$$\overline{X}_i(k) = \frac{1}{n} X_i(k) + \frac{n-1}{n} \overline{X}_i(k-1) \qquad (1)$$

where, $X_i(k)$=input data (k frame) and $\overline{X}_i(k)$=input to the memory 41, output signal $\hat{X}_i$ to be obtained at the terminal 21 in the stationary image part is:

$$\hat{X}_i(k) = \overline{X}_i(k) \qquad (2)$$

where, $\hat{X}_i(k)$ indicates the output signal with noise suppressed.

For example, in the moving image part, the noise eliminating filter 13 is selected, so that output signal $\hat{X}_i(k)$ at the time is:

$$\hat{X}_i(k) = med\ [X_{i-1}(k),\ X_i(k),\ X_{i+1}(k)] \qquad (3)$$

where, med[ ]: median filter processing;
$X_i(k)$: input data at current point of time;
$X_{i-1}(k)$: input data immediately before; and
$X_{i+1}(k)$: input data immediately after.

As shown in FIGS. 1 and 3, since the numbers of frames to be averaged by the number of continuous frames n are different, a noise elimination effect gets higher as the value n gets greater. Since n=1 at such a point as the transition point from the moving image part to the stationary image part, the output of the first multiplier 42 becomes zero to cause the input signal itself to be output from the filter 40, producing no after-image.

Since the embodiment is cyclically constituted to enter the output of the adder 44 into the frame memory 41, image information of the moving image part is cyclically averaged when the input image changes from moving to stationary. Consequently, as time passes, an influence of the moving image on the stationary image gets smaller, increasingly showing the noise elimination effect.

Figure 4:
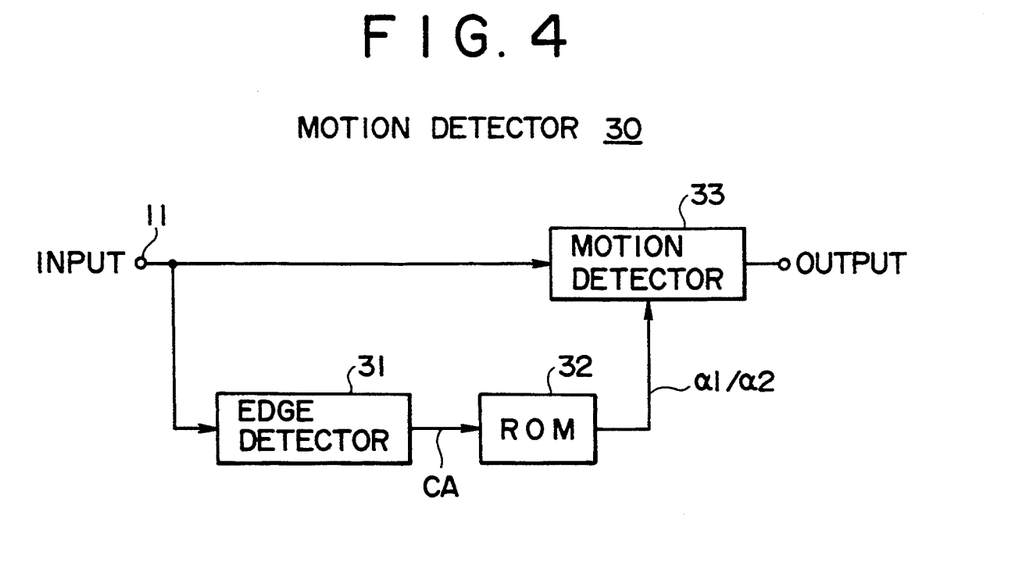
FIG. 4 is a block diagram illustrating a motion detector.
Figure 5:
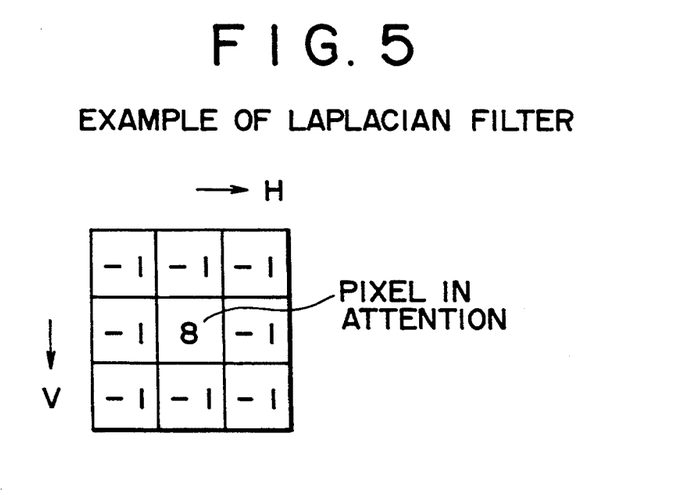
FIG. 5 is a diagram describing an example of a Laplacian filter for edge detection.

FIG. 4 shows the embodiment of the motion detector 30. In motion detection in the figure, threshold values for motion detection are adaptively varied between an edge portion and a non-edge portion of an image. Consequently, the input signal is supplied to an edge detector 31. In this embodiment, a Laplacian filter is used for edge detection. This Laplacian filter performs edge detection in blocks of 3×3 pixels including the pixel in attention set to a factor shown in FIG. 5. Corresponding input pixels are multiplied with Laplacian coefficients (−1 or 8) respectively. A sum of the multiplications is divided by 8 to provide a detection value (activity) L.

Referring to a 3×3 block (the nth frame) shown in FIG. 13, if pixels a through i are input levels, then the activity L is:

$$L = \tfrac{1}{8}\{8e - (a+b+c+d+f+g+h+i)\} \qquad (4)$$

This activity L is compared with a predetermined threshold value $\beta$.

If $L \geq \beta$, then the edge portion is detected; if $L < \beta$, then the non-edge portion is detected. Based on a comparison output CA obtained by this determination, a threshold value $\alpha$ (in this embodiment, $\alpha1$ or $\alpha2$ where $\alpha1 > \alpha2$) for the motion detector 33 is selected.

In this embodiment, a coefficient ROM 32 is provided as shown in FIG. 4. This ROM stores the two threshold values $\alpha1$ and $\alpha2$. When the edge portion is detected for example, $\alpha2$, which is smaller, is selected.

Based on the threshold value $\alpha$ selected by the comparison output CA, a motion of the input signal is determined in the same manner as described above with reference to FIG. 13. That is, the motion detector 33 performs following determination processing based on the comparison of sum S (sum of the difference between 3×3 pixels in a current frame and in a preceding frame, as shown in FIG. 13) with the two threshold values $\alpha1$ and $\alpha2$:

(1) $L < \beta$ (the non-edge portion)
  $S \geq \alpha1$ . . . the moving image part; and
  $S < \alpha1$ . . . the stationary image part.
(2) $L \geq \beta$ (the edge portion)
  $S \geq \alpha2$ . . . the moving part; and
  $S < \alpha2$ . . . the stationary part.

If the input image is found non-edge, or since presence of a noise is conspicuous in an area surrounded by edges, the greater threshold value $\alpha1$ is used for motion detection according to the case (1).

According to the case (1), it is more probable that the pixel is determined to be the stationary image part rather than the moving image part. Consequently, the filter for stationary image part 40 is selected. The filter for stationary image part 40 suppress a noise more than the filter for the moving image part 13 does, providing a higher noise elimination effect in the flat portion than the edge portion.

In the edge portion, the smaller $\alpha2$ is used according to the case (2), so that it is more probable that the pixel is determined to be moving rather than stationary unlike the case (1). Consequently, the noise elimination effect in the edge portion gets somewhat lower. But, since it is the edge portion, noise introduction is not so conspicuous. Therefore, using the smaller threshold value causes little influence on noise elimination.

Rather, using the filter for stationary image part 40 in the edge portion blurs the image because the filter is a time filter. In the above-mentioned constitution, it is more probable that the pixel is determined to be moving in the edge portion, so that the noise eliminating filter for stationary image part 40 is selected less often, posing no risk of blurring the image.

Thus, adaptively changing the threshold values for motion detection based on the edge information enhances the noise elimination effect in the non-edge portion, mitigating a picture quality degradation in the edge portion. Values for the above-mentioned $\alpha1$, $\alpha2$ and $\beta$ are suitably selected according to an application. Instead of the ROM 32, reference values of $\alpha1$ and $\alpha2$ may be selected. Any number of threshold values can be prepared.

Figure 6:
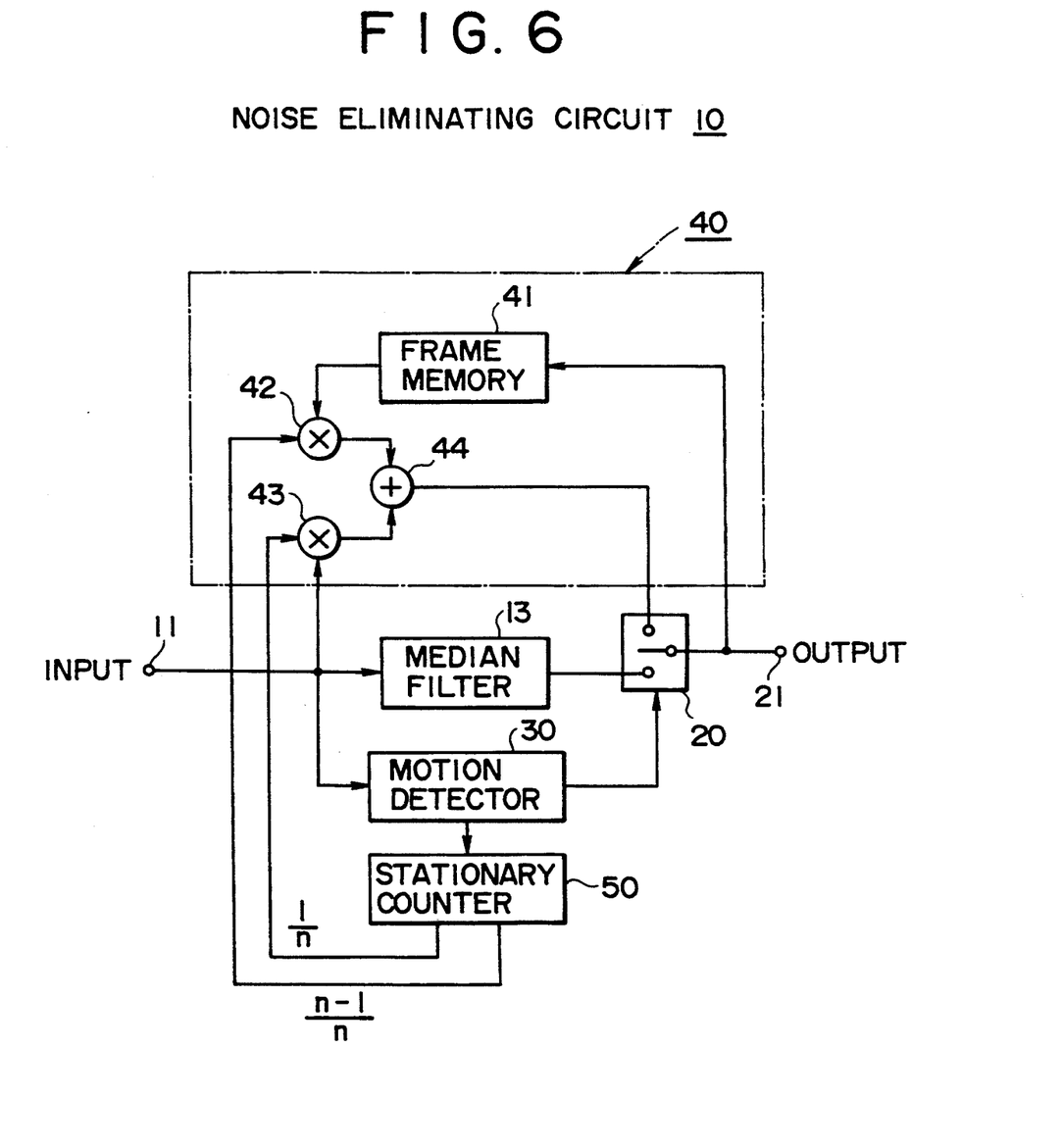
FIG. 6 is a diagram illustrating a variation to the embodiment of FIG. 1.

FIG. 6 shows a variation to the embodiment of FIG. 1. In the embodiment of FIG. 1, the input to the frame memory 41 is the output itself of the adder 44. In the embodiment of FIG. 6, an output signal obtained at an output terminal 21 is used. Except it, the embodiment of FIG. 6 is the same as the embodiment of FIG. 1.

Referring to FIG. 6, the output signal at the output terminal 21 is an output signal with a noise in space processed by a noise eliminating filter for moving image part 13 or an output signal with a noise in time processed by a noise eliminating filter for stationary image part 40. Therefore, each of the outputs is an output of the previous frame with the noise sufficiently suppressed. The output appearing at the output terminal 21 is expressed in an equation as follows:

$$\hat{X}_i(k) = \frac{1}{n} X_i(k) + \frac{n-1}{n} \hat{X}_i(k-1) \quad (5)$$

Therefore, in the filter 40 comprising a first multiplier 42, a second multiplier 43, an adder 44, and a frame memory 41, the above-mentioned output signal with the noise sufficiently suppressed is used as an input. An output signal of the previous frame weighted by the number of continuous stationary frames n is added to an input signal of the current frame weighted by the number of continuous stationary frames n. A result of the addition is used as a filter output.

Consequently, if a noise gets in the moving image part immediately before a point at which the moving image part becomes the stationary image part, the filter output with the noise suppressed by the filter 40 can be used as an output signal, resulting in a greater noise reducing effect at the above-mentioned changing point than that of the embodiment of FIG. 1.

Figure 7:
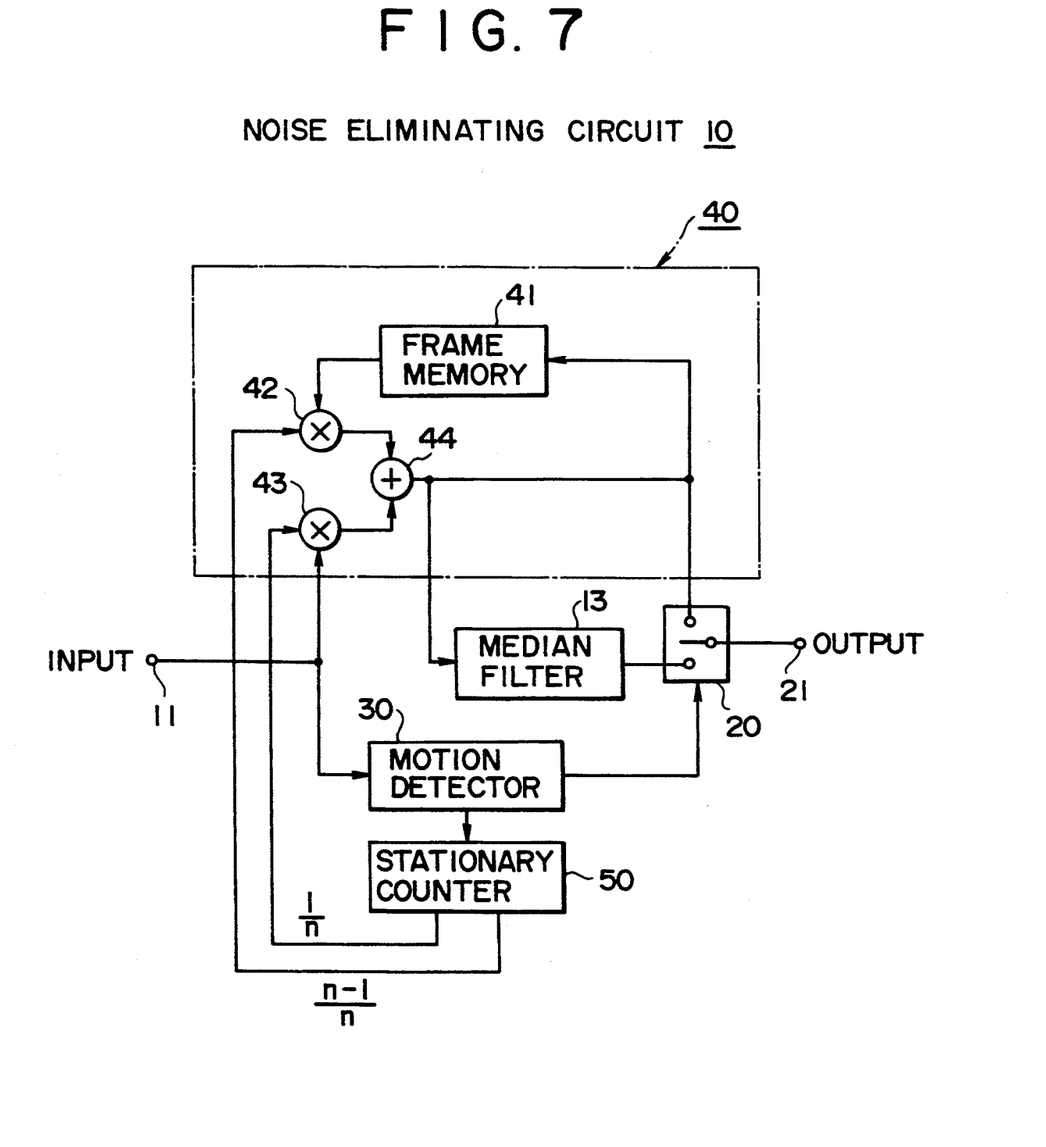
FIG. 7 is a diagram illustrating another variation to the embodiment of FIG. 1.

FIG. 7 shows a second variation to the embodiment of FIG. 1. In the embodiment of FIG. 1, an input signal itself of the current frame is used as an input signal to the noise eliminating filter for moving image part 13. In the embodiment of FIG. 7, however, a filter output of a noise eliminating filter for stationary image part 40 is used as an input signal to a noise eliminating filter for moving image part 13.

As a result, the filter output on which the noise elimination processing in terms of time has been performed is entered in the noise eliminating filter for moving image part 13, so that the noise elimination effect in the moving part is greater than that obtained by entering the input signal of the current frame for the noise processing in space.

Figure 8:
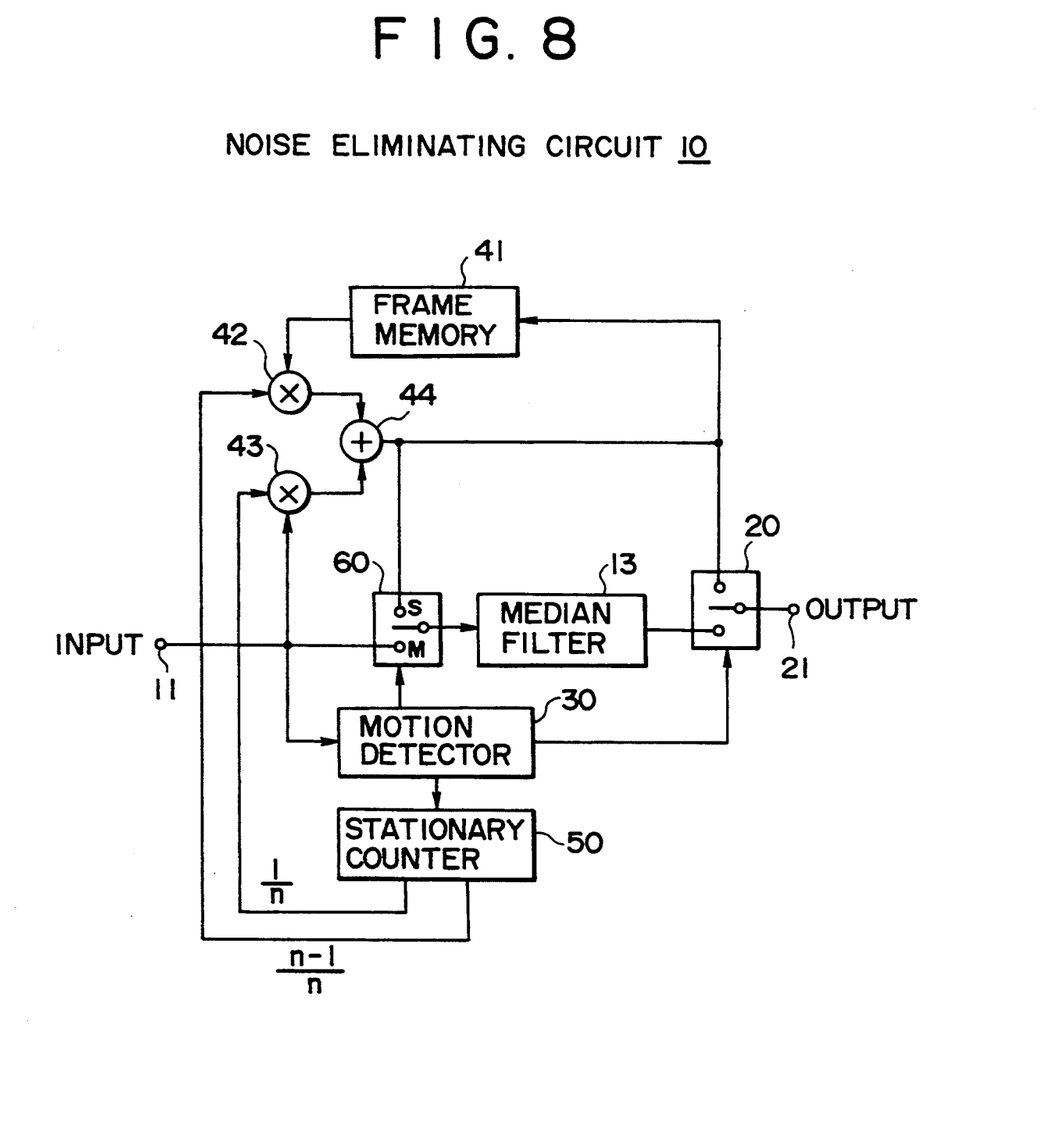
FIG. 8 is a diagram illustrating a variation to the embodiment of FIG. 7.

FIG. 8 shows a variation to the embodiment of the FIG. 7. In this variation, a switch 60 is provided before a noise eliminating filter for moving image part 13 to adaptively switch between the input signal of the current frame and an output signal of a previous frame according to a motion.

In the case of the moving image part, the input signal of the current frame is selected; in the case of the stationary image part, the output signal of the previous frame is selected. In the stationary image part, the noise elimination processing is performed based on the output signal of the previous frame with the noise sufficiently suppressed, providing an effective noise elimination. In addition, the an output of this noise elimination processing is supplied to a frame memory 41 for cyclic processing, totally providing a substantially significant noise suppressing effect.

In each of the above-mentioned embodiments, the filter output resulted from the noise elimination processing in time and the filter output resulted from the noise elimination processing in space are adaptively switched between according to the output of the motion detection.

Figure 9:
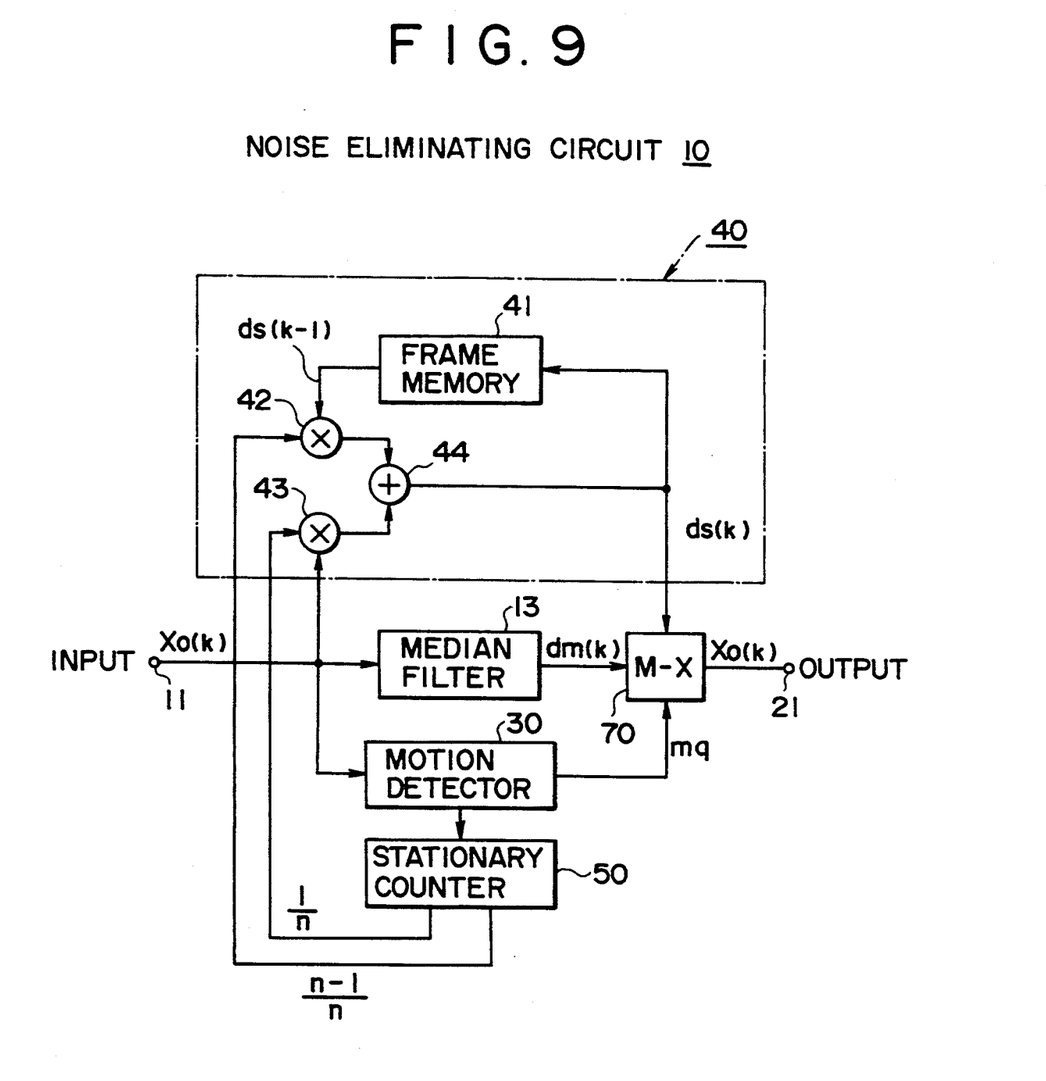

Referring to FIG. 9, the outputs of both filters are adaptively mixed for use without selecting one of the outputs. To implement such a constitution, a mixer 70 is provided instead of the switch 20 as used in the above-mentioned embodiments. A mixing ratio in the mixer 70 is controlled according to a quantity of motion of an input image.

Let the quantity of motion be mq, a filter output when a median filter is used as a noise eliminating filter for moving image part 13 be dm(k), and an output of a filter 40 (an output of an adder 41) be ds(k), then a final output signal to appear at an output terminal 21 will be:

$$dm(k) = \text{med}[X_{i-1}(k), X_i(k), X_{i+1}(k)] \quad (6)$$

$$ds(k) = \frac{1}{n} X_i(k) + \frac{n-1}{n} ds(k-1) \quad (7)$$

$$\hat{X}_i(k) = mq \times dm(k) + (1 - mq) \times ds(k) \quad (8)$$

$$mq = c \times \sum_{i=1}^{3} \sum_{j=1}^{3} |F_{k(i,j)} - F_{k-1(i,j)}| \quad (9)$$

where, $0 \leq mq \leq 1$

Fk: an input image value at a unit pixel of $3 \times 3$ block in k frame;

i, j: coordinates of pixel; and

C: constant

Thus, adaptively controlling the mixing ratio of the outputs of both filters according to the motion of the input image improves a picture quality degradation at a transition point between the moving image part and the stationary image part.

The mixing coefficient mq, (1−mq) is not linearly controlled according to the motion. Rather, it may be prepared in several types, one of which being adaptively selected. The above-mentioned embodiments can be combined with each other in any way. Some combinations provide the noise elimination in time and space more effectively than a single embodiment does. For motion detection, a single threshold value may be used as with the conventional constitution.

As described and according to the invention, there is provided a noise eliminating circuit wherein outputs of a filter in time and a filter in space are adaptively selected between according to a motion of an input signal.

This novel constitution effectively suppresses a noise introduced in a moving image or a stationary image, generating an output signal with a good picture quality.

Further, if outputs of the filters are adaptively mixed according to the motion of the input signal, a picture quality at a transition point between the moving image and the stationary image is substantially improved.

While the preferred embodiments of the invention have been described using specific terms, such description is for illustrative purpose only, and it is to be understood that changes and variations may be made without departing from the spirit or scope of the appended claims.

What is claimed is:

1. A noise eliminating circuit comprising:

a moving image filter for reducing noise of a moving image part of an input image;

a stationary image filter for reducing noise of a stationary image part of the input image;

a motion detecting circuit for detecting the motion of the input image; and a selecting circuit for selecting an output of one or the other of said filters based on an output of said motion detecting circuit;

wherein said stationary image filter combines an image part of the input image n times for n consecutive frames if said motion detecting circuit consecutively detects said image part as a stationary image part for said n consecutive frames, where n is a natural number.

2. A noise eliminating circuit comprising:

a moving image filter for reducing noise of a moving image part of an input image;

a stationary image filter for reducing noise of a stationary image part of the input image;

a motion detecting circuit for detecting the motion of the input image; and a mixing circuit for adaptively mixing outputs of said filters based on an output of said detecting circuit;

wherein said stationary image filter combines an image part of the input image n times for n consecutive frames if said motion detecting circuit consecutively detects said image part as a stationary image part for said n consecutive frames, where n is a natural number.

3. The noise eliminating filter according to claim 1, wherein said stationary image filter comprises:

a frame memory;

first multiplying means for multiplying the input image by 1/n;

second multiplying means for multiplying an output of said frame memory by $(n-1)/n$, wherein n is reset to 1 when said motion detecting circuit detects the motion of the input image; and adding means for adding outputs of said first and second multiplying means, wherein an output of said adding means is supplied to said frame memory.

4. The noise eliminating filter according to claim 2, wherein said output of said motion detecting circuit is indicative of a quantity of motion of the input image, and wherein said mixing circuit exhibiting a mixing ratio for mixing the outputs of said filters adaptively adjusts the mixing ratio in accordance with said output of said detecting circuit.

5. A noise eliminating circuit comprising:

a moving image filter for reducing noise of a moving image part of an input image;

a stationary image filter for reducing noise of a stationary image part of the input image;

a motion detecting circuit for detecting the motion of the input image; and a selecting circuit for selecting an output of one or the other of said filters based on an output of said motion detecting circuit, an output of said selecting circuit being supplied to said stationary image filter;

wherein said stationary image filter combines an image part of the input image n times for n consecutive frames if said motion detecting circuit consecutively detects said part as a stationary image part for said n consecutive frames, where n is a natural number.

6. A noise eliminating circuit comprising:

a moving image filter for reducing noise of a moving image part of an input image;

a stationary image filter for reducing noise of a stationary image part of the input image;

a motion detecting circuit for detecting the motion of the input image; and a mixing circuit for adaptively mixing outputs of said filters based on an output of said detecting circuit;

wherein said moving image filter is selectively supplied with the output of said stationary image filter and said stationary image filter combines an image part of the input image n times for n consecutive frames if said motion detecting circuit consecutively detects said part as a stationary image part for said n consecutive frames, where n is a natural number.

7. The noise eliminating circuit according to claim 5, wherein said stationary image filter comprises:

a frame memory for storing an output of said selecting means;

first multiplying means for multiplying the input image by 1/n;

second multiplying means for multiplying an output of said frame memory by $(n-1)/n$, wherein n is reset to 1 when said motion detecting circuit detects the motion of the input image; and adding means for adding outputs of said first and second multiplying means.

8. The noise eliminating circuit according to claim 1, further comprising:

counter means responsive to said motion detecting circuit for counting the number n of said consecutive frames in which said part of the input image is consecutively detected as a stationary part.

9. The noise eliminating circuit according to claim 2, further comprising:

counter means responsive to said motion detecting circuit for counting the number n of said consecutive frames in which said part of the input image is consecutively detected as a stationary part.

10. The noise eliminating circuit according to claim 3, wherein the output of said adding means is supplied to said moving image filter.

* * * * *